United States Patent [19]
Altman et al.

[11] 4,297,765
[45] Nov. 3, 1981

[54] FISH SCALER WITH WATER HANDLE

[75] Inventors: Wilbur E. Altman; William C. McQuay, both of Charlotte, N.C.

[73] Assignee: Wilbur E. Altman, Charlotte, N.C.

[21] Appl. No.: 131,233

[22] Filed: Mar. 17, 1980

[51] Int. Cl.³ .............................................. A22C 25/02
[52] U.S. Cl. .......................................... 17/66; 17/19; 401/207; 401/289
[58] Field of Search .......................... 17/66, 67, 69, 19; 401/207, 289, 290

[56] References Cited

U.S. PATENT DOCUMENTS

| | | | |
|---|---|---|---|
| 1,317,437 | 9/1919 | Drury | 401/290 X |
| 1,456,977 | 5/1923 | Geib | 401/290 |
| 2,822,560 | 2/1958 | Pape | 401/290 X |
| 2,884,658 | 5/1959 | Johnson | 17/67 |
| 3,135,990 | 6/1964 | Bergmann et al. | 401/290 X |
| 3,667,086 | 6/1972 | Sexton | 17/66 |
| 3,694,097 | 9/1972 | Fedorek | 401/207 X |

FOREIGN PATENT DOCUMENTS 486253  11/1929  Fed. Rep. of Germany .......... 17/66

Primary Examiner—Willie G. Abercrombie
Attorney, Agent, or Firm—Clifton T. Hunt

[57] ABSTRACT

A water outlet comprising a hollow handle with means at one end for connection to a conventional garden hose and a flanged water outlet at the other end comprising a plurality of downwardly directed axially aligned ports between opposed transversely extending flanges to selectively receive one of several accessories including a fish scaler comprising a baffle beneath the ports to divert the water laterally and about serrated edges on both sides of the baffle.

7 Claims, 12 Drawing Figures

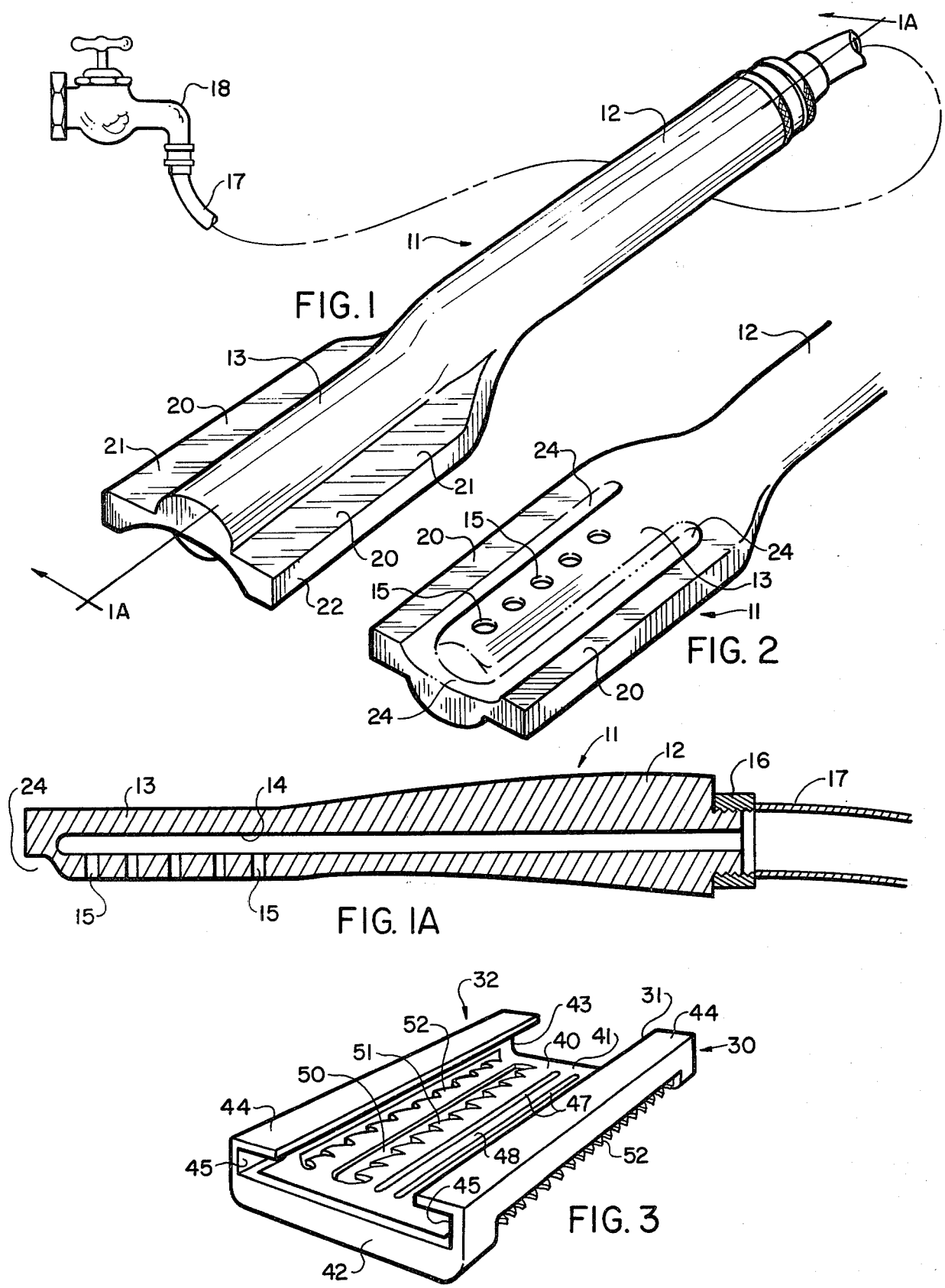

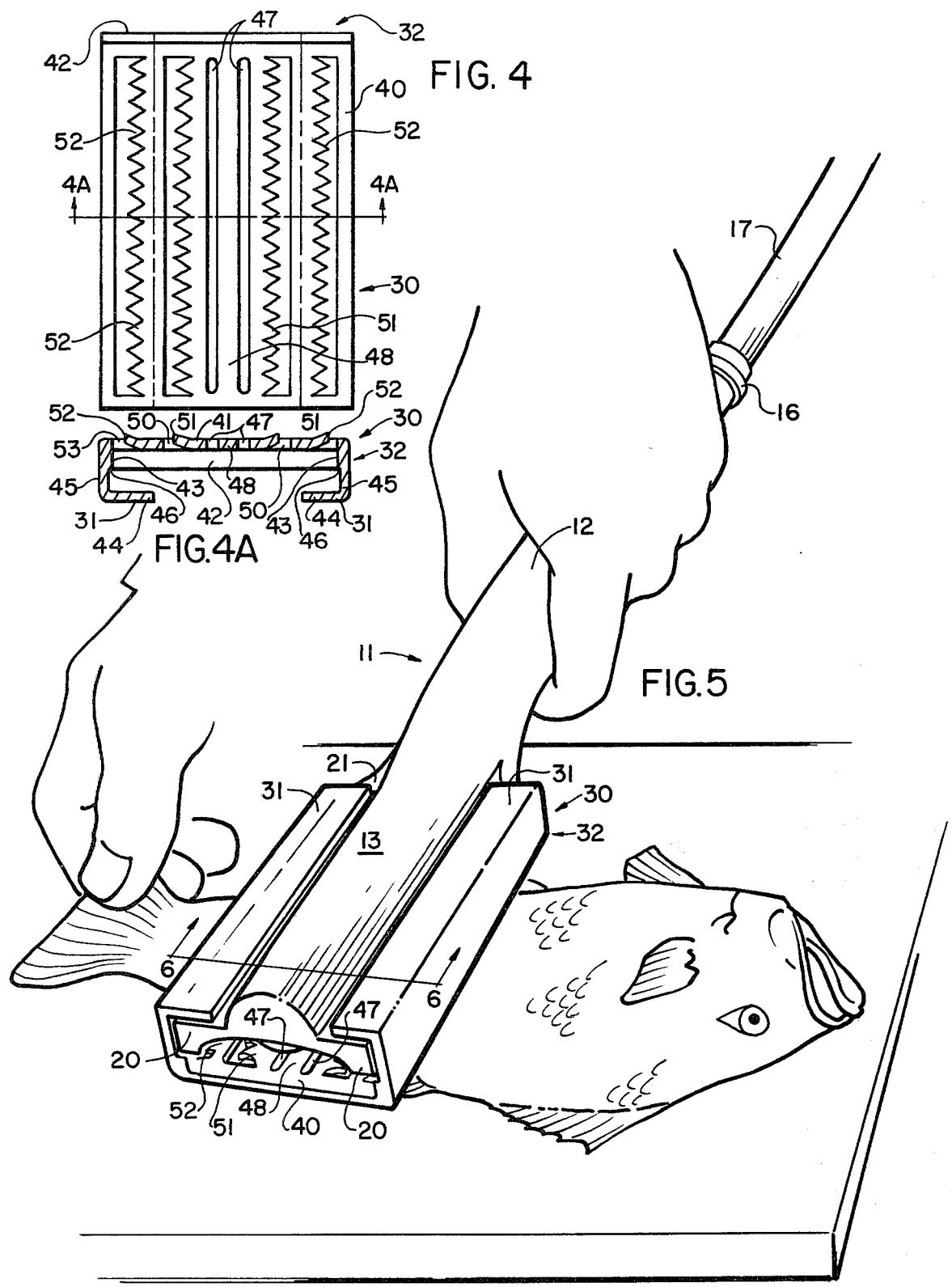

FISH SCALER WITH WATER HANDLE

BACKGROUND OF THE INVENTION

The attachment of cleaning devices such as brushes, mops, fish scalers and the like to a source of water supply is not new. See for example the fish scaler and its water supply disclosed in U.S. Pat. 3,667,086 issued June 6, 1972 to Paul A. Sexton. Sexton is exemplary of the prior art known to applicant in that the fish scaler is formed integral with the water handle and no means are provided for substituting another cleaning accessory such as a brush or mop to the handle of Sexton. The cleaning devices of the prior art are single purpose tools and completely separate tools must be purchased for each desired cleaning operation.

The Sexton Patent also illustrates the prior art known to applicant for the construction of fish scalers connected to a source of water. According to such prior art fish scalers as exemplified by Sexton, the water is delivered from the handle in perpendicular relation to the fish being cleaned with the undesirable result that loosened scales sometimes accumulate between the laterally spaced cleaning blades which tend to block the flow of water when the blades are pressed against the fish during the scaling process.

SUMMARY OF THE INVENTION

According to the present invention the opposed transversely extending flanges on the outlet or water handle are dimensioned to receive any one of a variety of tools adapted for performing different cleaning functions. The multi-purpose outlet includes a hollow handle through which water may flow by connection of the conventional fitting at one end of the handle to a standard garden hose. The flanged outlet at the other end of the handle receives a selected tool so that a consumer need purchase only one handle for use with a variety of tools, instead of separate handles formed integral with the single purpose tools of the prior art.

A variety of cleaning tools may be attached to the water outlet of the present invention by providing each such tool with an appropriately shaped and dimensioned channel to receive the flanges on the handle. A fish scaler, a brush, and a mop are illustrated as being representative of the tools which may be used. Any other tool may be used with the handle of the present invention and the illustrated embodiments are exemplary only and not exhaustive.

The fish scaler illustrated as the preferred embodiment of that type of tool includes means in the form of a baffle for diverting water laterally outwardly through passageways in the fish scaler so that loosened scales are quickly removed before they can accumulate and clog the scaling tool.

BRIEF DESCRIPTION OF THE DRAWINGS

Some of the objects of the invention having been stated other objects will appear when considering the following description in connection with the accompaning drawings, in which:

FIG. 1 is a perspective view of the outlet or water handle of the present invention connected to a garden hose which is in turn conventionally connected to a source of water;

FIG. 1A is a vertical sectional view taken substantially along the line 1A—1A in FIG. 1;

FIG. 2 is an inverted plan view of the water handle looking at the side opposite that shown in FIG. 1;

FIG. 3 is a perspective view of a preferred form of fish scaler for attachment to the water handle shown in FIG. 1;

FIG. 4 is an inverted plan view of the fish scaler looking at the side opposite that shown in FIG. 3;

FIG. 4A is a vertical sectional view taken substantially along the line 4A—4A in FIG. 4;

FIG. 5 is an environmental perspective view illustrating the use of the fish scaler to clean a fish;

DETAILED DESCRIPTION OF THE INVENTION

Figure 6:
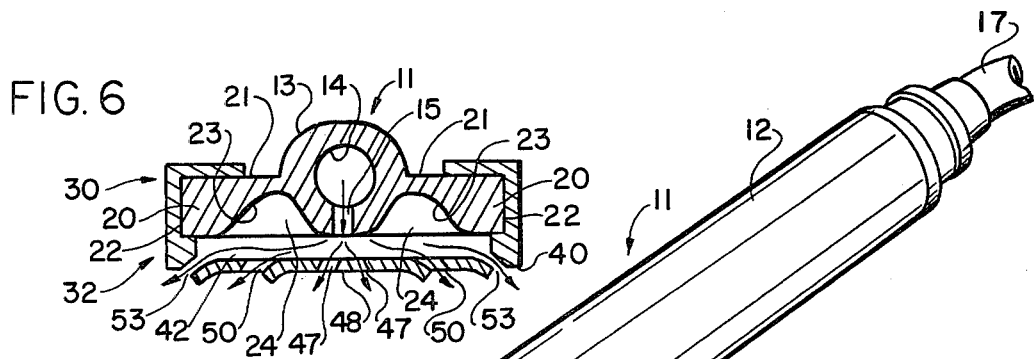
FIG. 6 is a vertical sectional view taken substantially along the line 6—6 in FIG. 5.

Referring more specifically to the drawings, a water outlet or water handle is broadly indicated at 11. The water handle 11 includes a hollow handle portion 12 which may be gripped in a person's hand as shown in FIG. 5 and a flanged outlet portion 13 having a passageway 14 as an axial extension of the passageway through the hollow handle 11 (FIG. 1A). A plurality of axially aligned ports 15 establish communication between the passageway 14 and the atmosphere along the bottom of the outlet portion 13.

The water handle 11 includes a conventional female hose connector 16 at the end of the water handle 12 opposite the outlet portion 13. The connector 16 connects the water handle 12 to a conventional water hose 17 which may be of the type conventionally used for domestic purposes and connected to a source of water 18.

Figure 8:
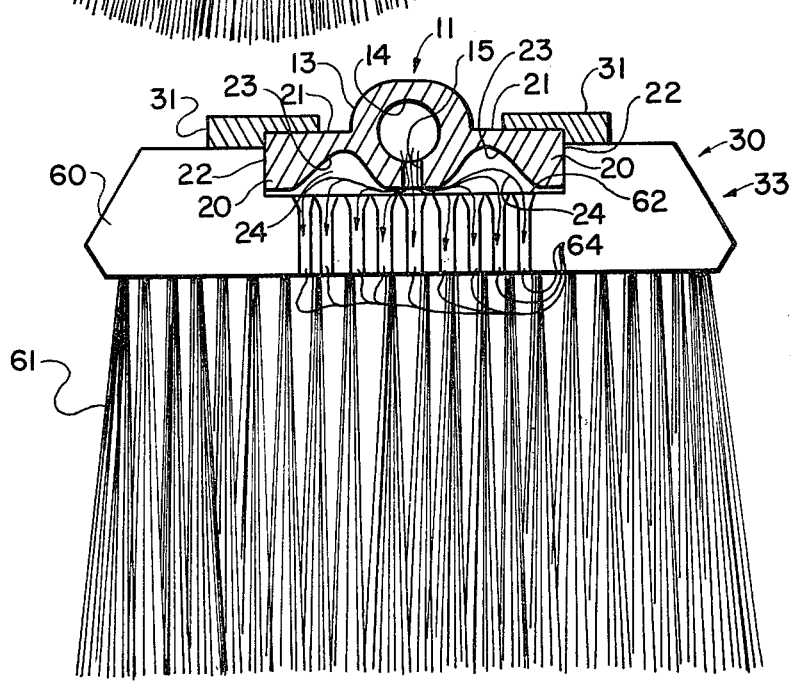
FIG. 8 is a vertical sectional view taken substantially along the line 8—8 in FIG. 7.
Figures 9, 10:
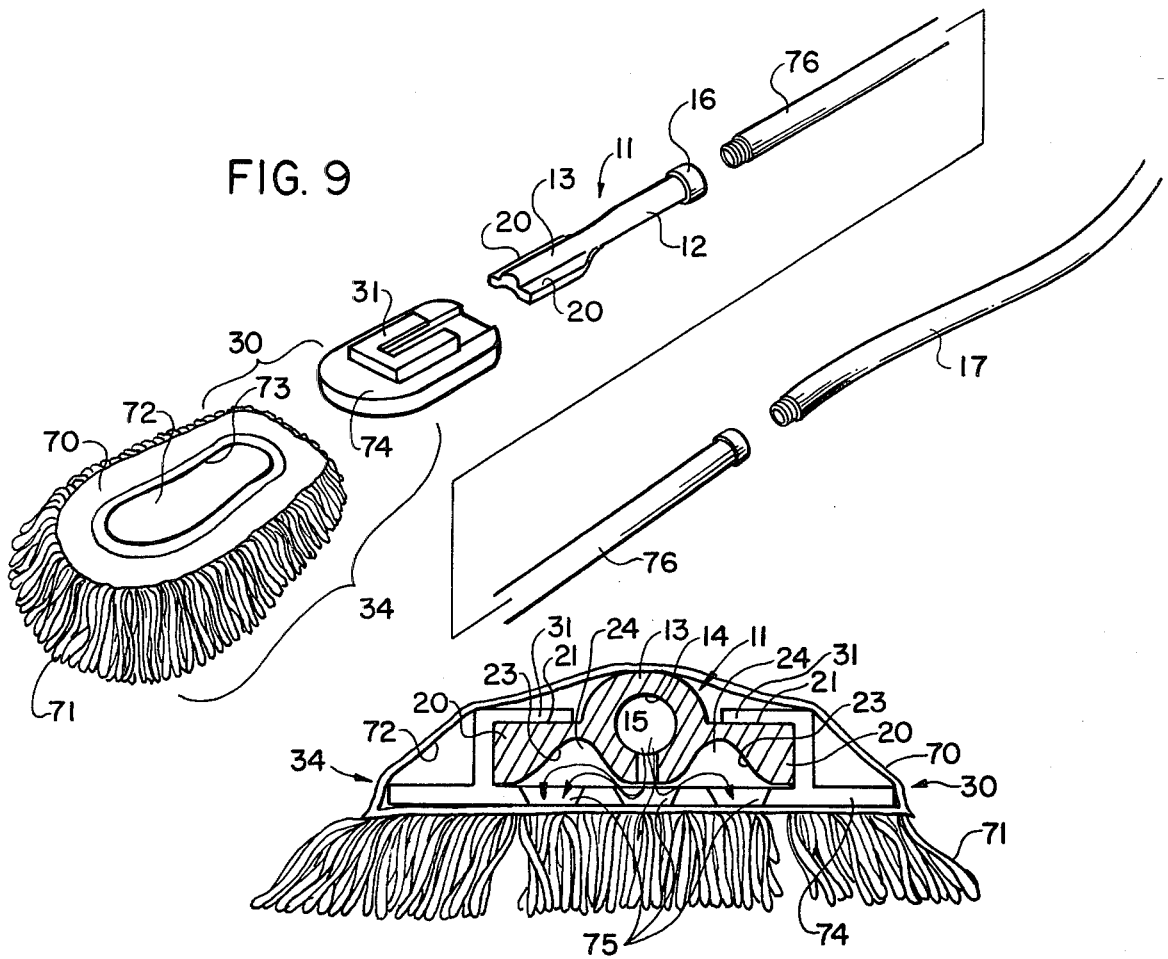
FIG. 9 is an exploded perspective view illustrating the attachment of a mop to the water handle and use of an extension between the water handle and the hose.
FIG. 10 is a vertical sectional view of the mop of FIG. 9 and its associated mounting plate assembled on the water handle.

The outlet portion 13 includes a pair of oppositely directed transverse flanges 20 formed integral with and extending from the mid-point of the outlet portion 13. As best seen in FIGS. 6, 8 and 10 the outlet portion 13 is of tubular construction and the flanges 20 are extensions of the horizontal diameter of the outlet 13 in FIGS. 6, 8 and 10. As seen in these Figures each flange 20 has a straight horizontally extending top wall 21 and a vertically extending sidewall 22. The flanges 20 are relatively thin at their juncture with an outlet 13 and the bottom walls 23 of flanges 20 taper downwardly and outwardly at their juncture with sidewalls 22 to define a channel 24 which extends longitudinally along opposide sides of the outlet 13 and transversely across the front of the tubular outlet 13.

The flanges 20 are shaped and dimensioned to fit within guides 31 of a selected tool 30, the fish scaler 32 (FIGS. 3-6), the brush 33 (FIGS. 7 and 8), and the mop 34 (FIGS. 9 and 10) being the illustrated embodiments.

THE FISH SCALER OF FIGS. 3-6

The guides 31 on the first scaler 32 are formed integral with a body portion 40 of rectangular configuration and including a bottom wall 41, and end wall 42 and side walls 43. The guides 31 on the fish scaler 32 are of cross sectional L-shaped configuration including a horizontal leg 44 and a vertical leg 45 in FIGS. 3 and 4A. The vertical walls 43 on the body portion 40 are spaced closer together than the vertical legs 45 of guides 31 to define shoulders 46 at the juncture of the side walls 43 of body portion 40 with the side walls 45 of guides 31 (FIG. 4A).

The bottom wall 41 of fish scaler 32 includes an imperforate baffle 48 extending along its longitudinal axis and disposed beneath the ports 15 when the scaler 32 is operatively assembled on the outlet 13. Slots or openings 47 through the bottom wall 41 extend longitudinally on both sides of baffle 48 and in parallel relation thereto. Additional slots or openings 50 are spaced laterally from the slots 47 and the inner edges of the slots 50 are serrated as at 51. The lateral edges of bottom wall 41 are also serrated as indicated at 52 and the lateral edges of the bottom wall 41 are spaced from the side walls 43 of body portion 40 to define longitudinal slots or openings 53. Thus, in operation the laterally diverted water passes outwardly through the slots 47, 50 and 53 on both sides of the serrated edges 52 and 51 to constantly cleanse them of scales and other matter and reliably keep the tool from becoming clogged.

The end wall 42 is located on the inner end of fish scaler 32 in use, that is, it is the end through which the free end of the outlet portion of water handle 11 first passes when the scaler 32 is being assembled on the water handle for use. The end wall 42 serves to block water from flowing back toward the operator, and as best seen in FIG. 5, the outer end of fish scaler 32 opposite the end wall 42 is open and unobstructed so that some water which is not laterally diverted by baffle 48 will pass freely through the open end of the fish scaler to keep the fish scaler clean and unclogged at all times during use.

THE BRUSH OF FIGS. 7 AND 8

Figure 7:
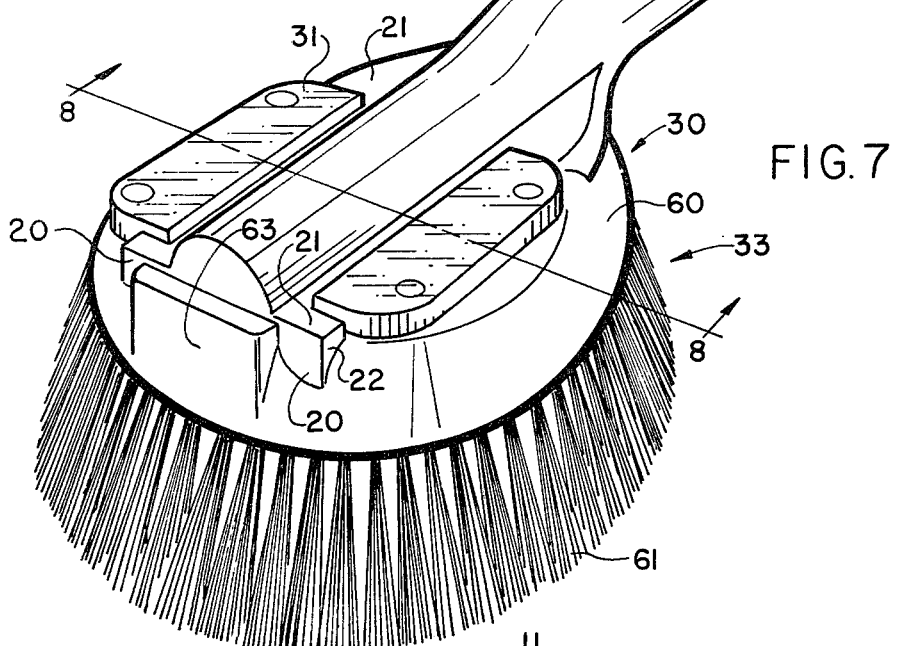
FIG. 7 is a perspective view of the water handle attached to a brush.

Referring now to the brush 33 illustrated in FIGS. 7 and 8, it comprises a base 60 within which a plurality of bristles 61 are firmly embedded in a conventional manner. The surface of the base opposite the bristles 61 has a rectangular recess 62 extending across the surface. The recess is of a width sufficient to snugly receive the flanges 20 on the outlet portion 13 of the water handle 11 and is illustrated as being of shallow depth so that the top wall 21 of the flanges extends above the top surface of the base 60 and extend partially across the recess 62 to receive and retain the flanges 20. One end of the recess 62 is closed by an abutment or stop 63 against which the free end of the outlet portion 13 rests in the assembled relation of FIG. 7. The base 63 cooperates with the recess 62 in blocking water which passes through the ports 15 in the outlet 13.

The base 60 has a plurality of vertically extending passageways 64 establishing communication between the recess 62 and the bristles on the opposite side of the base 60.

In use, water passing through ports 15, flows into the channel 24 and then through the passageways 64 and along the bristles 61 to the site of the work.

THE MOP OF FIGS. 9 AND 10

The mop 34 of FIGS. 9 and 10 includes a backing or body portion 70 made from a textile fabric and to which the mop strings 71 are attached in a conventional manner. The body portion 70 has a pocket 72 with an opening 73 sized and shaped to receive and then close around guides 31 mounted on a base 74 dimensioned to snugly fit within the pocket 72.

The base 74 has a plurality of passageways 75 arranged in a rectangular configuration between the guide elements 31. When assembled as shown in FIG. 10 the passageways 75 lie immediately beneath the ports 15 in outlet 13 and the chamber 24 extending along both sides of the ports 15. Water thus passes through the ports 15 into the chamber 25 and outwardly through the passageway 75 to flow along the mop strings to the work being cleaned.

FIG. 9 illustrates the use of a hollow extension 76 which may be threadably attached between the water handle 11 and the hose 17 to facilitate the mopping of floors or the reaching of remote places to be cleaned. The extension 76 will, of course, be found equally useful with the brush 33 and such other tools as it is desired to use with the water handle 11.

Although specific terms have been employed in describing the invention they have been used in a descriptive sense only and not for purposes of limitation.

We claim:

1. A fish scaler comprising a bottom wall having a longitudinal axis and plurality of transversely spaced openings through the bottom wall on both sides of the longitudinal axis and parallel thereto, an imperforate baffle extending along the longitudinal axis, the marginal edges of the openings including serrations on both sides of the longitudinal axis, imperforate sidewalls extending from the bottom wall, and means directing water against the baffle whereby the water is diverted laterally about the serrations and outwardly through the openings.

2. A fish scaler according to claim 1 wherein the means directing water against the baffle include a source of water, a flexible hose connected to the source of water, a water handle connected to the flexible hose, said water handle including a hollow handle portion which may be gripped in a person's hand, a flanged outlet portion having a passageway as an axial extension of the passageway through the hollow handle and at least one port establishing communication between the passageway in the outlet portion and the atmosphere along the bottom of the outlet portion, and said port opening toward said baffle.

3. A fish scaler according to claim 2 wherein a plurality of ports are axially aligned along the bottom of the flanged portion of the water handle.

4. A fish scaler according to claim 2 which includes an end wall depending from the bottom wall adjacent the juncture of the flanged portion with the handle portion.

5. A fish scaler according to claim 1 wherein the serrations on both sides of the baffle extend angularly outwardly and away from the baffle.

6. A fish scaler according to claim 3 wherein the outer end of the fish scaler is open and unobstructed and through which water passes during the fish scaling operation, whereby the fish scaler is kept clean and unclogged at all times during use.

7. A fish scaler according to claim 1 wherein the outer end of the fish scaler is open and unobstructed and through which water passes during the fish scaling operation, whereby the fish scaler is kept clean and unclogged at all times during use.

* * * * *